(12) United States Patent
Villamar

(10) Patent No.: US 9,365,021 B2
(45) Date of Patent: Jun. 14, 2016

(54) SYSTEMS AND METHODS FOR LAYERED MANUFACTURING

(71) Applicant: Daniel Judge Villamar, North Las Vegas, NV (US)

(72) Inventor: Daniel Judge Villamar, North Las Vegas, NV (US)

( * ) Notice: Subject to any disclaimer, the term of this patent is extended or adjusted under 35 U.S.C. 154(b) by 546 days.

(21) Appl. No.: 13/933,138

(22) Filed: Jul. 2, 2013

(65) Prior Publication Data

US 2014/0174000 A1 Jun. 26, 2014

Related U.S. Application Data

(60) Provisional application No. 61/848,209, filed on Dec. 26, 2012, provisional application No. 61/956,307, filed on Jun. 5, 2013.

(51) Int. Cl.
*G06F 19/00* (2011.01)
*B32B 37/02* (2006.01)

(52) U.S. Cl.
CPC ...................................... *B32B 37/02* (2013.01)

(58) Field of Classification Search
None
See application file for complete search history.

(56) References Cited

U.S. PATENT DOCUMENTS

| 5,079,829 | A | * | 1/1992 | Yoshiji | B23P 19/001 29/563 |
|---|---|---|---|---|---|
| 5,125,149 | A | * | 6/1992 | Inaba | B23P 19/001 198/341.05 |
| 5,438,647 | A | * | 8/1995 | Nagamatsu | B25J 9/0084 700/247 |
| 6,059,169 | A | * | 5/2000 | Nihei | B23K 37/047 228/44.3 |
| 6,233,503 | B1 | * | 5/2001 | Yim | G06N 3/008 345/12 |
| 6,360,801 | B1 | * | 3/2002 | Walter | B29C 63/0056 156/353 |
| 2005/0095091 | A1 | * | 5/2005 | Fukada | B23P 21/004 414/222.01 |

FOREIGN PATENT DOCUMENTS

EP 1609532 A1 * 12/2005 ............. B05B 13/04

* cited by examiner

*Primary Examiner* — Prasad Gokhale
(74) *Attorney, Agent, or Firm* — Georgiy L. Khayet

(57) ABSTRACT

Provided are systems and methods for layered manufacturing using dispenser robots. The system for layered manufacturing may comprise a plurality of dispenser robots configured to dispense one or more materials. The one or more materials may be layered one on top of another to form a plurality of products. The system may also comprise a moving unit configured to enable movement of the plurality of dispenser robots in relation to the plurality of products. The plurality of dispenser robots may include a plurality of holders configured to grip and release piece of materials. Additionally, the system may comprise one or more attachment units configured to attach the one or more materials to the plurality of products.

20 Claims, 7 Drawing Sheets

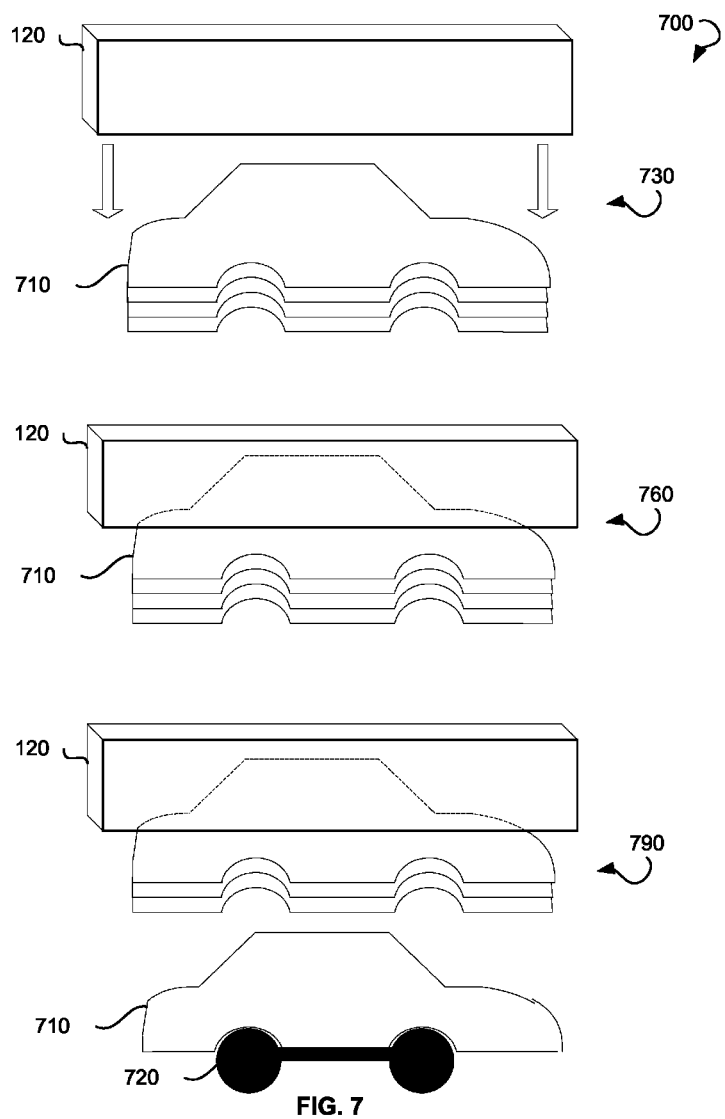

SYSTEMS AND METHODS FOR LAYERED MANUFACTURING

CROSS-REFERENCE TO RELATED APPLICATIONS

The present utility patent application claims priority benefit of the U.S. provisional applications No. 61/848,209, filed on Dec. 26, 2012, and No. 61/956,307, filed on Jun. 5, 2013. The subject matters of these provisional applications are incorporated herein by reference for all purposes to the extent that such subject matters are not inconsistent herewith or limiting hereof.

FIELD

This application relates generally to manufacturing processes and, more specifically, to systems and methods for layered manufacturing.

BACKGROUND

Automated robots are used to increase productivity, quality, and efficiency in the production of goods. Conventional automated robots include production robots, timber framing machines, wooden framing fabrication systems, systems for assembling framed wall sections, wall component fabricating jig, and so forth. One of the disadvantages of these robots is in their inability to form layered products by attaching different layers one by one. Thus, manufacturing of such products may require human labor, which increases production cost.

Moreover, conventional automated robots cannot use other machinery that can be guided past the products being manufactured. While these devices may be suitable for the particular purpose to which they address, they are not as suitable for constructing objects with multiple parts such as houses, automobiles, sandwiches, and the like.

In these respects, systems and methods for layered manufacturing according to the present disclosure substantially departs from the conventional concepts and designs of the prior art, and in so doing provides an apparatus primarily developed for the purpose of constructing objects with multiple parts such as houses, automobiles, and sandwiches.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for layered manufacturing using dispenser robots. The layered manufacturing system may comprise a plurality of dispenser robots configured to dispense one or more materials. The materials may be layered one on top of another to form a plurality of products. The materials may include paint, vanish, coating, plaster, plywood, wooden planks, Styrofoam boards, stucco, wire mesh, machine parts, food products, food substances, and so forth. Additionally, the system may comprise a moving unit configured to enable movement of the dispenser robots in relation to the products. In some embodiments, the moving unit may include a conveyor transporting the products, while in alternative embodiments, the moving unit may include guide ways, with the dispenser robots moving along the guide ways.

In some embodiments, the system may further comprise one or more attachment units configured to attach the materials to each other. The attachment units may include nail guns, adhesive spreading units, screw driving machines, and so forth.

Additionally, the dispenser robots may include a plurality of holders configured to grip, position, and release the materials.

Provided also is a method for layered manufacturing. The method may comprise providing a plurality of dispenser robots configured to dispense one or more materials and also providing a moving unit configured to enable movement of the plurality of dispenser robots in relation to the plurality of products. The materials may be layered one on top of another to form a plurality of products. The materials may include paint, vanish, coating, plaster, plywood, wooden planks, Styrofoam boards, stucco, wire mesh, machine parts, food products, food substances, and so forth. The moving unit may include a conveyor transporting the products, and/or guide ways, with the dispenser robots moving along the guide ways.

Additionally, the method may comprise providing one or more attachment units configured to attach the materials. The attachment units may include nail guns, adhesive spreading units, screw driving machines, and so forth.

In some embodiments, the dispenser robots may include a plurality of holders configured to grip and release the materials.

Provided also is a layered house frame manufacturing system. The system may comprise a plurality of dispenser robots configured to dispense one or more building materials. The building materials may include paint, vanish, coating, plaster, plywood, wooden planks, Styrofoam boards, stucco, wire mesh, and so forth. The building materials may be layered one on top of another to form a plurality of building sections. Further, the system may comprise a moving unit. The moving unit may be configured to enable movement of the dispenser robots in relation to the building sections. In some embodiments, the moving unit may hold the building sections in front of the dispenser robots while moving the building sections. In alternative embodiments, the moving unit may hold the dispenser robots and move the dispenser robots in front of the building sections.

Additionally, the system may comprise one or more attachment units configured to attach the building materials to the building sections. The attachment units may include nail guns, adhesive spreading units, screw driving machines, and so forth.

Furthermore, in some embodiments, dispenser robots may include a plurality of holders configured to grip and release single pieces of the building materials, such as, for example, plywood boards, wooden planks, Styrofoam boards, and so forth.

Other features and exemplary embodiments are described below.

BRIEF DESCRIPTION OF DRAWINGS

Embodiments are illustrated by way of example and not limitation in the figures of the accompanying drawings, in which like references indicate similar elements and in which:

FIG. 7 illustrates sample operations for layered manufacturing of automobile products, in accordance to certain example embodiments.

DETAILED DESCRIPTION

Systems and methods for layered manufacturing using a plurality of dispenser robots are described herein. A layered manufacturing method may enable automated manufacturing of layered goods and products by sequential adding of various layers of materials using dispenser robots. Dispenser robots may hold various materials, and each dispenser robot may be adapted to a specific material. To enable sequential application of materials on the products being manufactured, a moving unit may be provided. The moving unit may move the products being manufactured along a range of dispenser robots. During the moving, dispenser robots may attach different materials or parts to the products, thus forming the products. Alternatively, the moving unit may move the dispenser robots along a range of products being manufactured.

In various embodiments, dispenser robots may hold different types of materials, including liquid and soft materials (e.g. paint, vanish, coating, plaster, and so forth) and solid or piece materials (wood, plywood, wooden planks, Styrofoam boards, wire mesh, machine parts).

To attach certain materials, the dispenser robots may include attachment units. The attachment units may depend on the type of material they are designed to attach and may include nail guns, adhesive spreading units, screw driving machines, and so forth.

Additionally, the dispenser robots may include holders configured to grip, position, and release piece materials. A holder may grip an item loaded into a dispenser robot and position it appropriately. The attachment units may attach the positioned item.

Figure 1:
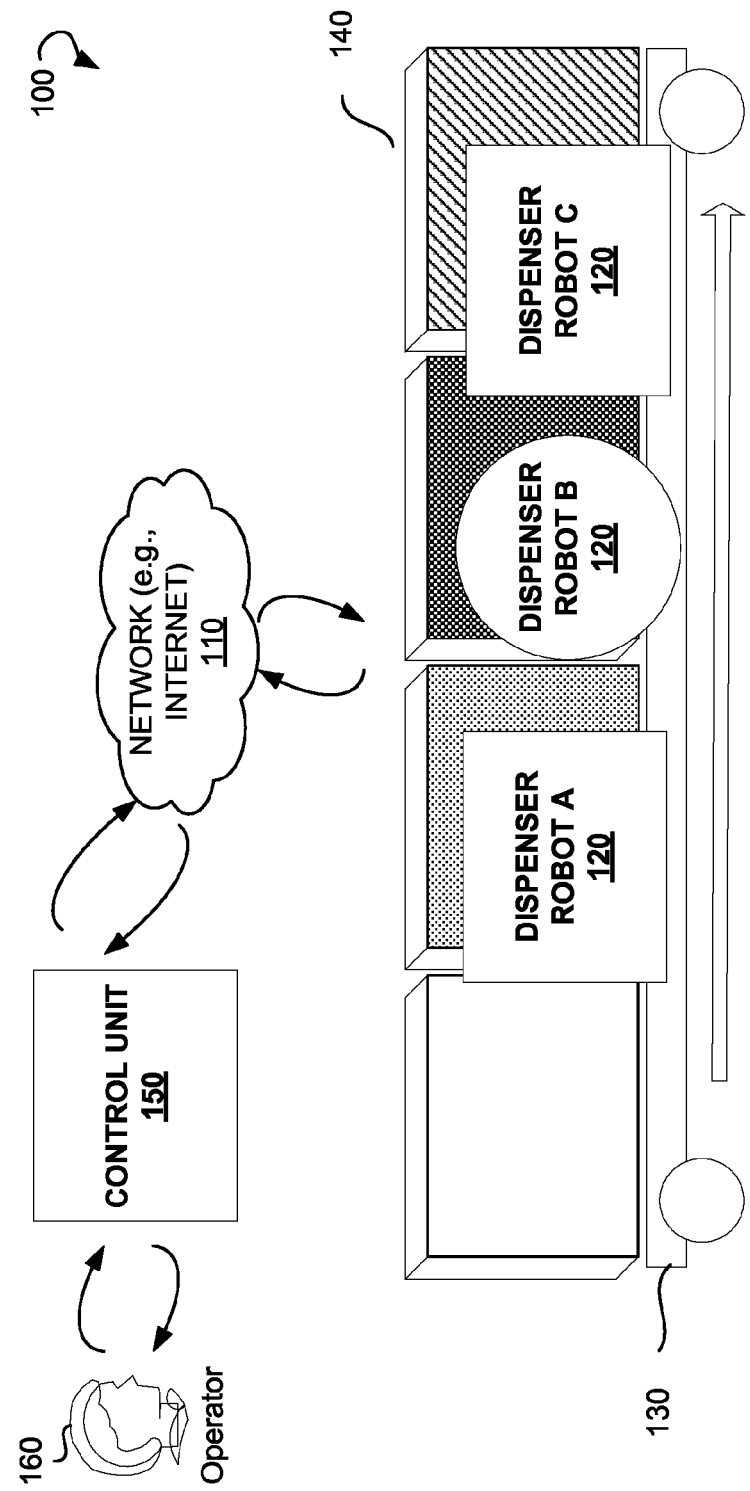
FIG. 1 illustrates an example environment for systems and methods for layered manufacturing using a plurality of dispenser robots.

Referring now to the drawings, FIG. 1 illustrates an environment 100 within which systems and methods for layered manufacturing using dispenser robots A-C 120 can be implemented. The environment 100 may include a network 110, the dispenser robots A-C 120, a moving unit 130, products 140, and a control unit 150.

The dispenser robots A-C 120 may be positioned in proximity to the products 140. Each of the dispenser robots A-C 120 may hold different materials forming a component of the products 140. For example, the dispenser robot A 120 may hold plywood boards, the dispenser robot B 120 may hold stucco, and the dispenser robot C 120 may hold paint. The moving unit 130 may enable movement of the dispenser robots A-C 120 in relation to the products 140. In some embodiments, the movement may be realized by moving the dispenser robots A-C 120 in relation to the products 140; however, in other embodiments, the products 140 may be moved in relation to the dispenser robots A-C 120.

While the products 140 move in front of the dispenser robots A-C 120, the dispenser robots A-C 120 may attach the materials to the products layer by layer. In such a way, the products 140 may be manufactured. Each of the dispenser robots A-C 120 may be configured to attach a material with which it is associated. For example, if the dispenser robot A 120 is configured to attach plywood boards, it may include holders to hold a plurality of plywood boards and to position one board after another. Additionally, the dispenser robot A 120 may include attachment units to attach the positioned board to the product 140. The attachment units may include, for example, nail guns, adhesive spreading units, screw driving machines, and so forth.

The process of layered manufacturing using the dispenser robots A-C 120 may be controlled by the control unit 150. An operator 160 may communicate with the dispenser robots A-C 120 and/or the moving unit 130 via the control unit 150. The control unit 150 may convert commands received from the operator 160 into operating instructions comprehensible for the dispenser robots A-C 120 and/or the moving unit 130. The operating instructions may be transmitted to the dispenser robots A-C 120 and/or the moving unit 130 via the network 110. Additionally, the control unit 150 may receive data from the dispenser robots A-C 120 and/or the moving unit 130 via the network 110.

The network 110 may include Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

In some embodiments, the control unit 150 may communicate with the dispenser robots A-C 120 and/or the moving unit 130 by wires.

Figure 2:
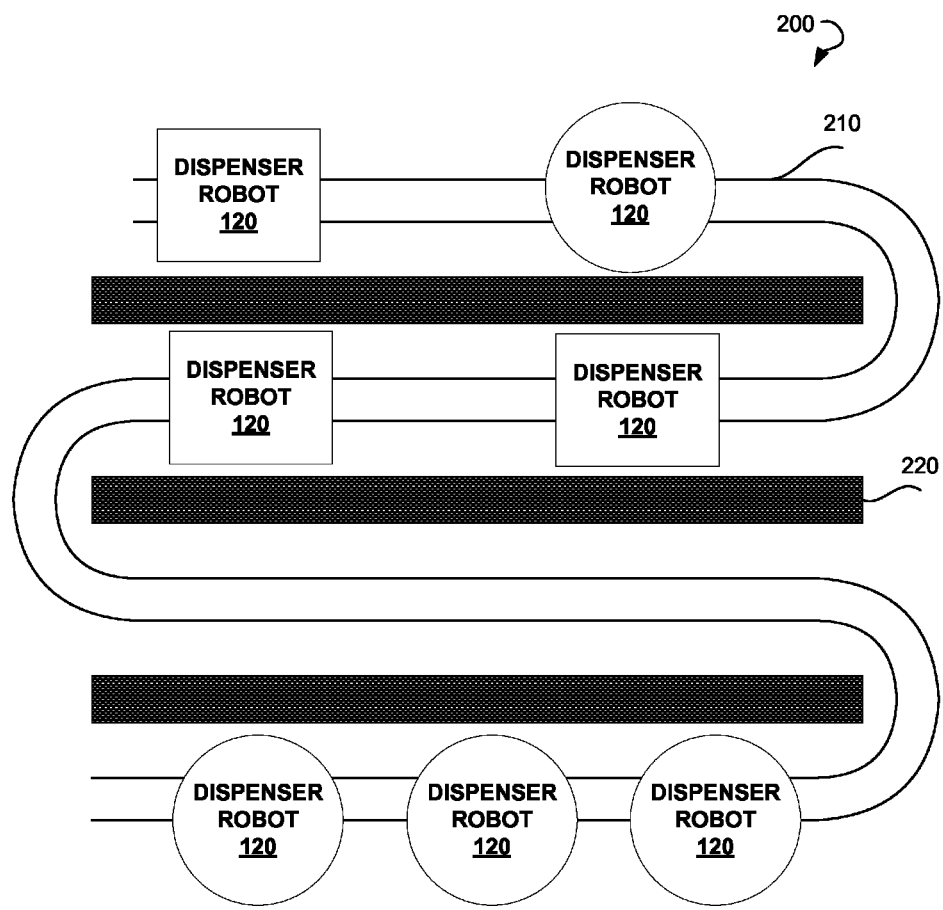
FIG. 2 illustrates a top view of an example layered manufacturing line, in accordance to certain example embodiments.

FIG. 2 illustrates top view 200 of an example layered manufacturing line, in accordance to certain example embodiments. Products 220 may be located in proximity to dispenser robots 120. The dispenser robots 120 may be moved along the products 220 by a moving unit 210.

The moving unit 210 may include guide ways configured to enable movement of the dispenser robots 120 in relation to the products 220.

The guide ways may include a track or a set of tracks that are connected together. The guide ways may form a straight line or a curved line.

In some example embodiments, the guide ways may include one or more tracks directing the dispenser robots 120 into a desired direction. The tracks may be constructed into a variety of different shapes and sizes. The shape of the one or more tracks may include bullhead, flat bottom, and so forth. A tip end of the one or more tracks may be triangular shaped, round shaped, rectangular shaped, square shaped, diamond shaped, half circle shaped, and so forth. In some embodiments, the tip end of the one or more tracks may be T-shaped, L-shaped, C-shaped, or may have any other suitable shape or combination of suitable shapes.

The one or more tracks may intersect with each other to form a grid pattern made up of squares and/or rectangles when viewed overhead. Additionally, there may be a number of tracks forming S-shaped pathways connected to each other at their ends. In a top view, the S-shaped pathways may have angled rather than rounded corners. The pathways that are formed by the tracks may be substantially rectangular-shaped, square-shaped, circle-shaped, oval-shaped, and so forth.

In some embodiments, a track may consist of a groove that extends down the length of a member forming the track. The dispenser robot may include one or more pins extending from the robot and in between the walls of the groove. The pins may interlock with the groove to keep the dispenser robot on track while directing the robot into the desired location.

In some embodiments, individual track segments may be connected together by bendable joints that lock and unlock and may be formed by hedges. The hedges may bend to the left or right and may lock and unlock. If a joint is locked, a track segment may not be to swing to the left or the right at the locked joint that connects it to another track segment. When a joint is unlocked, the track segment that is connected to another track segment by that joint may be able to swing to the left and/or right at that joint. Some joints may be locked while other joints may be unlocked along a single guide way. The joints may be able to lock and unlock automatically.

Furthermore, mechanical devices such as motors may automatically bend the joints. The tracks may be connected with hedges capable of disconnecting. Such hedges may swing to the left and to the right on an axle. The axle that forms the hedge may be automatically positioned to allow the hedge to disconnect or positioned to prevent disconnecting.

Individual track segments may have arched tip ends or angled tip ends. A joint may be formed where the arched or angled tip end meets the tip end of another track segment. Angled tip ends may consist of tip ends that have one straight edge and one slanted edge to form an angle, or two slanted edges that form an angle. To cover the gaps created by the arched or angled tip ends of the track segments, track segments may include flat surfaces. A flat surface at the tip end of one track segment can overlap with a flat surface of another track segment.

Track segments with arched or angled tip ends may allow the track segments to swing to the left and to the right at their joints in order to allow two wall pieces to connect together and to form a right angle or an acute angle.

In various embodiments, the tracks may be located in upper or lower parts of the dispenser robots 120 and/or products 220.

In alternative embodiments, the moving unit 210 may include a conveyor transporting the products 220 along the dispenser robots 120.

The conveyor may be a device comprising at least two pulleys with a continued loop of material. The conveyor may position products 220 in a proper position. The conveyor may include rails and/or other objects on both of its longer sides to secure the products 220.

The conveyor may be attached to a track or a set of tracks. The tracks may be attached underneath or at the side of the conveyor base. The tracks may provide for precise placement of the products 220.

Figure 3:
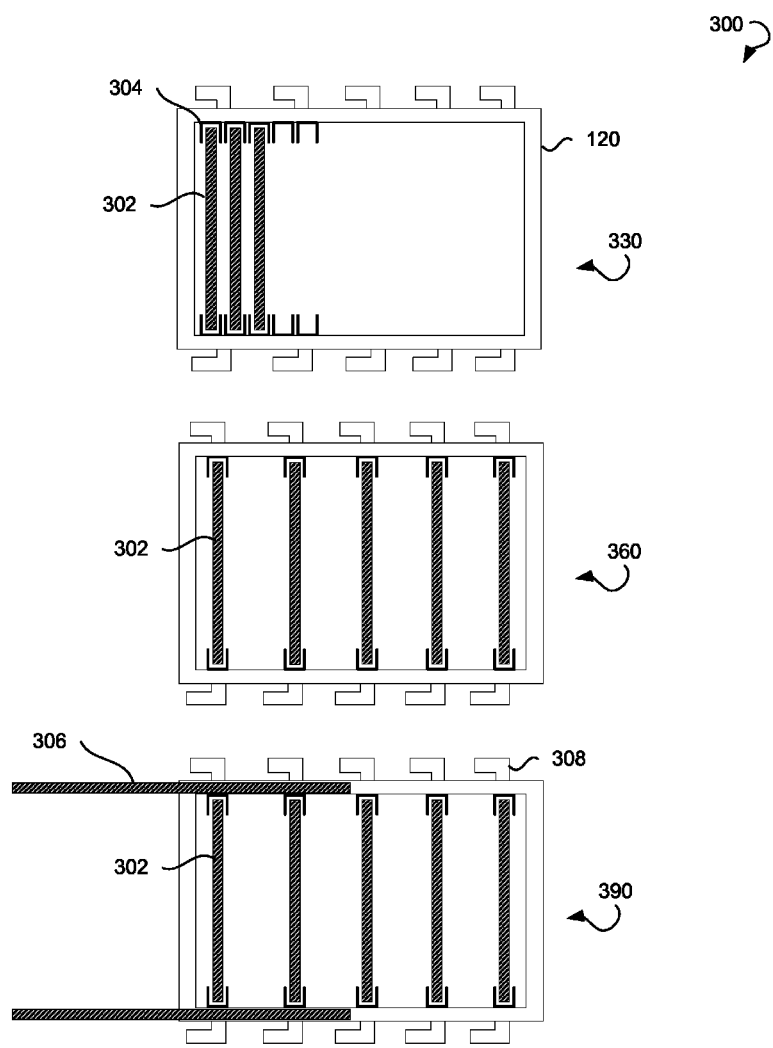
FIG. 3 illustrates operations of example dispenser robots for layered manufacturing, in accordance to certain example embodiments.

FIG. 3 illustrates operations 300 of example dispenser robots 120 for layered manufacturing, in accordance to certain example embodiments. A specific type of dispenser robot 120 may be used for the manufacturing of frame pieces.

An individual frame piece may consist of a plurality of bars connected together. Some of the bars may be positioned horizontally and some vertically. To manufacture a frame piece, the plurality of vertical bars 302 may be loaded into a dispenser robot 120 at operation 330. Holders 304 may grip the vertical bars 302 in the dispenser robot 120.

A holder 304 may consist of three flat rectangular shaped plates connected together. The holder 304 may hold a vertical bar 302 while it is being nailed or secured.

At operation 360, the vertical bars 302 may be moved by the holders 304 to desired locations. The holders 304 may be moved horizontally by motors, wheels, and/or robots.

At operation 390, horizontal bars 306 may be loaded and properly positioned in relation to the vertical bars 302. When positioned, the horizontal bars 306 and the vertical bars 302 may be attached together using attachments units, such as nail guns 308.

A nail gun 308 may be a mechanical device used to drive nails into solid materials (for example, wooden planks, plywood, and so forth). The nail guns 308 may use electromagnetism, compressed air, gas, such as butane or propane, and the like.

Figure 4:
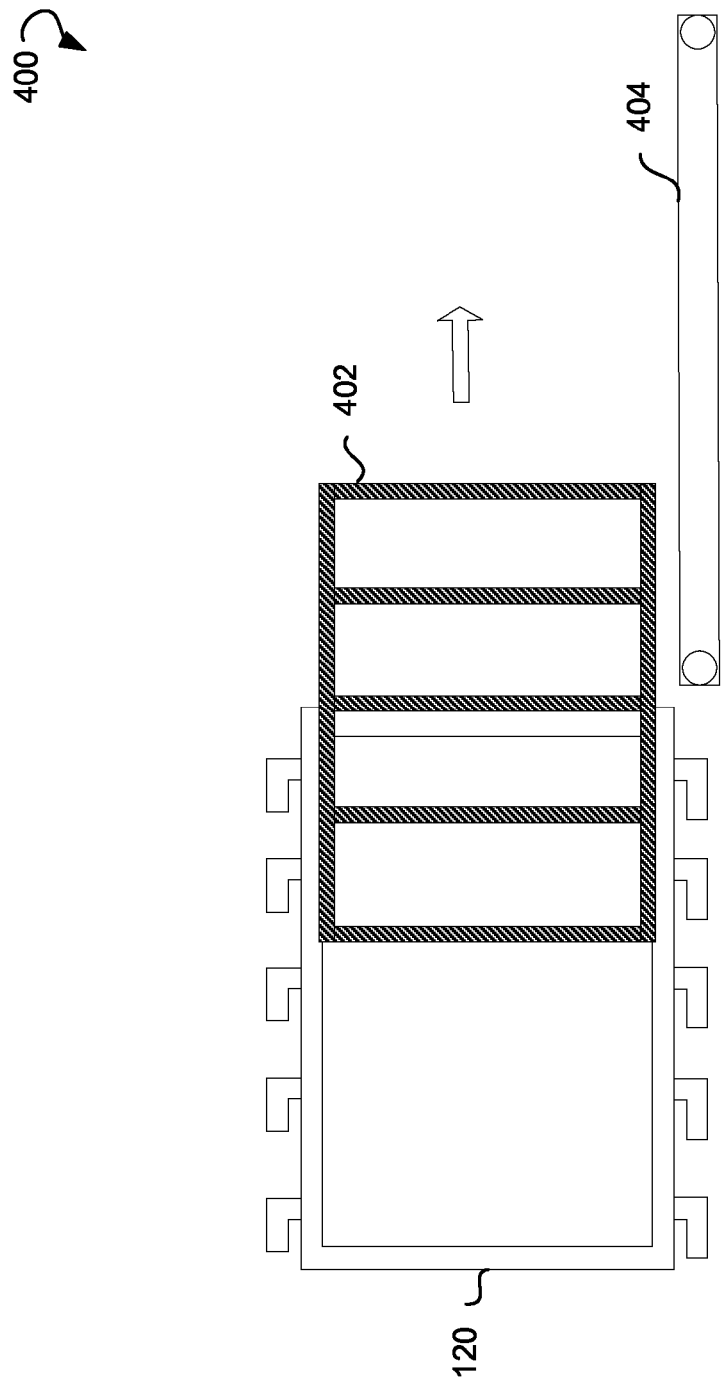
FIG. 4 illustrates layered manufacturing of a building section, in accordance to certain example embodiments.

FIG. 4 illustrates layered manufacturing 400 of a building section 402, in accordance to certain example embodiments. The building section 402 may be attached together by a dispenser robot 120. The building section may be removed from the dispenser robot 120.

To remove the building section 402 from the dispenser robot 120 a moving unit may be used. The moving unit may include a conveyor 404 as shown by FIG. 4. The conveyor 404 may move the building section 402 to another dispenser robot to continue with the manufacturing procedure of the building section 402 if required.

Apart from producing building sections, layered manufacturing may be used to produce various types of products. For example, layered food products, such as sandwiches, or automobile products may be produced using layered manufacturing processes. Some example embodiments of layered manufacturing using dispenser robots will be described with reference to FIGS. 6-7.

Figure 5:
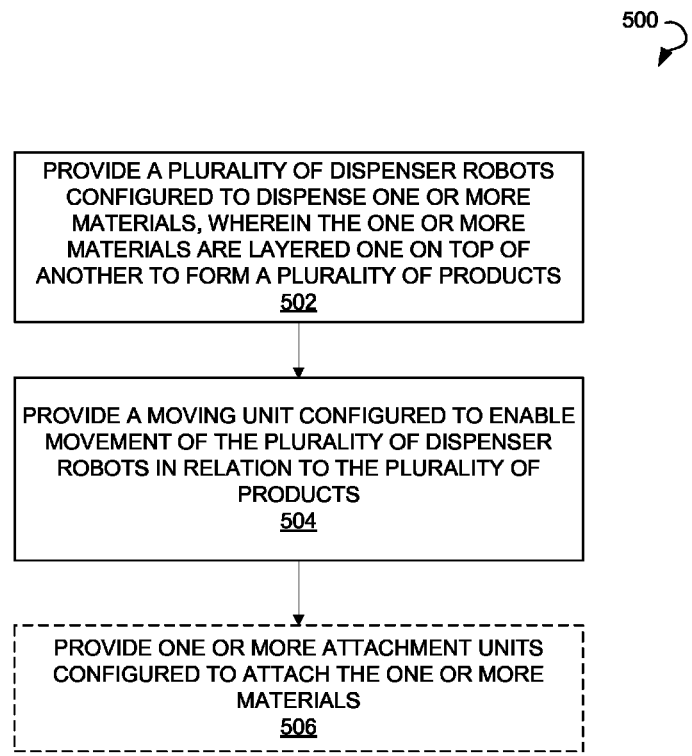
FIG. 5 is a flow chart illustrating a method for layered manufacturing using dispenser robots, in accordance with certain example embodiments.

FIG. 5 illustrates is a flow chart illustrating a method 500 for layered manufacturing using dispenser robots, in accordance to certain example embodiments. Method 500 may start with a providing, at operation 502, a plurality of dispenser robots. The dispensed robots may be configured to dispense one or more materials. The materials may include liquid, solid, and other types of materials. Some examples of the materials may include paint, vanish, coating, plaster, plywood, wooden planks, Styrofoam boards, stucco, wire mesh, machine parts, food products, food substances, and so forth.

The dispenser robots may hold different materials which may be layered one on top of another to form a plurality of products.

To enable successive layering of different materials, a moving unit may be provided at operation 504. In some embodiments, the moving unit may move or provide for moving of the plurality of dispenser robots. Thus, the moving unit may be a conveyor moving the dispenser robots disposed on the conveyor or the products disposed on the conveyor. Alternatively, the moving unit may include guide ways providing a path for the dispenser robots to move. The dispenser robots may move using motors or other means.

At optional operation 506, one or more attachment units may be configured to attach the one or more materials. The attachment units may be disposed on the dispenser robots. The attachment units may include nail guns, adhesive spreading units, screw driving machines, and so forth.

Additionally, a plurality of holders may be provided. The holders may be disposed on the dispenser robots and configured to grip, move, and release single pieces of the materials.

In some embodiments, the dispenser robots may self-load with the materials which are components of the products to be manufactured. A dispenser robot may move to a stack or a row of individual units of a material (e.g. a stack of plywood boards) and load the stack. The dispenser robot may attach the individual units of the material one by one to other materials that are the components of the products to be manufactured.

Figure 6:
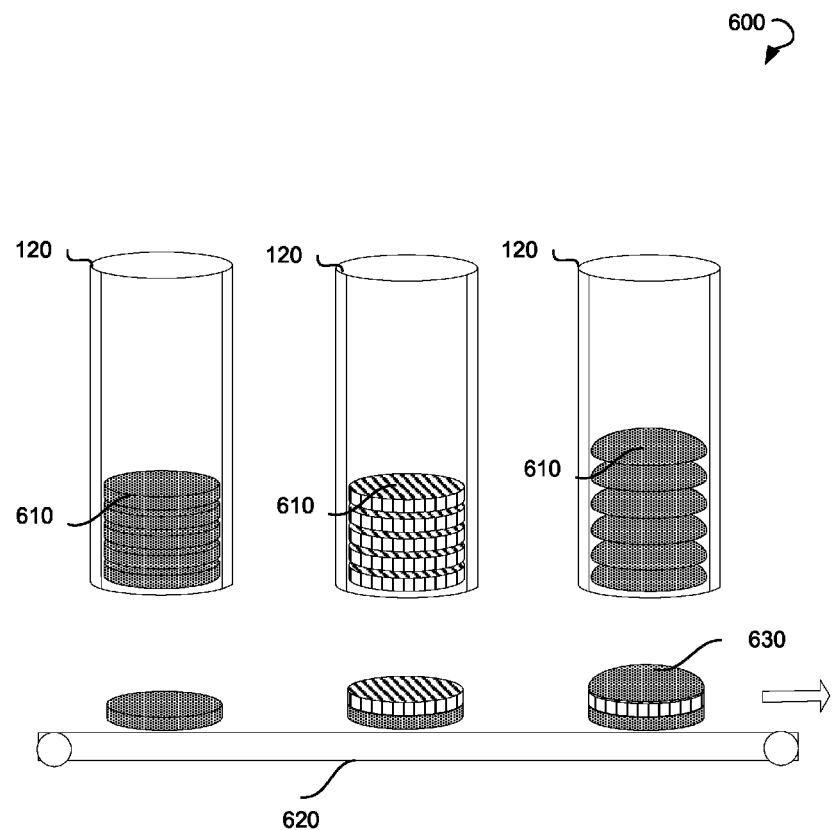
FIG. 6 illustrates a sample line for layered manufacturing of food products, in accordance to certain example embodiments.

FIG. 6 illustrates a sample line 600 for layered manufacturing of food products, in accordance to certain example embodiments. The sample line 600 may include a plurality of dispenser robots 120. The dispenser robots may hold various materials 610. The dispenser robots 120 may be designed to dispense the materials 610. Each of the dispenser robots 120 may be configured to dispense a specific type of material 610 the dispenser robot 120 holds.

A moving unit 620 may move products 630 being manufactured in relation to the dispenser robots 120. Thus, the materials 610 may be layered one after another by the dispenser robots 120 to form manufactured products.

In alternative embodiments, the dispenser robots 120 may move in relation to the products 630, while the products 630 stay still.

FIG. 7 illustrates sample operations 700 for layered manufacturing of automobile products, in accordance to certain example embodiments.

Layered manufacturing process may also be used to construct other types of complicated objects that consist of numerous parts such as automobiles. At operation 730, a dispenser robot 120 may move to a stack or a row of at least one of parts 710 which make up an automobile (for example, automobile body frames) and pick up the stack or the row. At operation 760, the dispenser robot 120 may move along a guide way holding the parts 710.

At operation 790, the dispenser robot 120 may release one of the parts 710 and attach the part to another automobile part 720 (for example, a wheelbase).

Another dispenser robot may attach another part to the parts 710 and 720. Thus, an automobile may be constructed.

An attachment unit to connect an automobile part to the automobile being constructed may be connected to the dispenser robot 120 and/or may be located separately.

Thus, various systems and methods for layered manufacturing using a plurality of dispenser robots have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A layered manufacturing system comprising:
 a plurality of dispenser robots configured to dispense one or more materials, wherein the one or more materials are layered one on top of another to form a plurality of products; and
 a moving unit configured to enable movement of the plurality of dispenser robots in relation to the plurality of products.

2. The system of claim 1, wherein the one or more materials include paint, vanish, coating, plaster, plywood, wooden planks, Styrofoam boards, stucco, wire mesh, machine parts, food products, and food substances.

3. The system of claim 1, further comprising one or more attachment units configured to attach the one or more materials.

4. The system of claim 3, wherein the one or more attachment units include nail guns, adhesive spreading units, and screw driving machines.

5. The system of claim 1, wherein the moving unit includes a conveyor transporting the plurality of products.

6. The system of claim 1, wherein the moving unit includes guide ways, the plurality of dispenser robots moving along the guide ways.

7. The system of claim 1, wherein the one or more materials include piece materials, the plurality of dispenser robots including a plurality of holders configured to grip and release the piece materials.

8. A method for layered manufacturing comprising:
 providing a plurality of dispenser robots configured to dispense one or more materials, wherein the one or more materials are layered one on top of another to form a plurality of products; and
 providing a moving unit mechanically coupled to the plurality of dispenser robots and configured to enable movement of the plurality of dispenser robots in relation to the plurality of products.

9. The method of claim 8, wherein the one or more materials include paint, varnish, coating, plaster, plywood, wooden planks, Styrofoam boards, stucco, wire mesh, machine parts, food products, and food substances.

10. The method of claim 8, further comprising providing one or more attachment units configured to attach the one or more materials, wherein the one or more attachment units include nail guns, adhesive spreading units, and screw driving machines.

11. The method of claim 8, wherein the plurality of dispenser robots is further configured to move to a stack or a row of the one or more materials and to self-load the stack or the row, the stack or the row being used to dispense the one or more materials.

12. The method of claim 8, wherein the moving unit includes a conveyor transporting the plurality of products.

13. The method of claim 8, wherein the moving unit includes guide ways, the plurality of dispenser robots moving along the guide ways.

14. The method of claim 8, further comprising providing a plurality of holders configured to grip and release one or more materials.

15. A layered house frame manufacturing system comprising:
 a plurality of dispenser robots configured to dispense one or more building materials, wherein the one or more building materials are layered one on top of another to form a plurality of building sections; and a moving unit, the moving unit being configured to enable movement of the plurality of dispenser robots in relation to the building sections; and one or more attachment units configured to attach the one or more building materials to the plurality of building sections.

16. The system of claim 15, wherein the moving unit holds the plurality of building sections in front of the plurality of the dispenser robots and moves the plurality of building sections.

17. The system of claim 15, wherein the moving unit holds the plurality of dispenser robots and moves the plurality of dispenser robots in front of the plurality of building sections.

18. The system of claim 15, wherein the one or more building materials include paint, varnish, coating, plaster, plywood, wooden planks, Styrofoam boards, stucco, and wire mesh.

19. The system of claim 15, wherein the one or more attachment units include nail guns, adhesive spreading units, and screw driving machines.

20. The system of claim 15, wherein the plurality of dispenser robots includes a plurality of holders configured to grip and release single pieces of the one or more building materials, the one or more building materials including a plurality of plywood boards, a plurality of wooden planks, and a plurality of Styrofoam boards.

* * * * *